UNITED STATES PATENT OFFICE.

NICOLAS ISELI, OF CHAUX-DE-FONDS, SWITZERLAND.

FILTERING MATERIAL FOR PURIFYING ALCOHOLS, OILS, OR OTHER SUBSTANCES.

SPECIFICATION forming part of Letters Patent No. 556,578, dated March 17, 1896.

Application filed February 18, 1893. Serial No. 462,889. (No specimens.) Patented in France January 28, 1893, No. 225,642; in England February 9, 1893, No. 2,896; in Belgium February 9, 1893, No. 103,392; in Italy February 10, 1893, No. 33,505; in Austria-Hungary August 26, 1893, No. 12,700; in Sweden October 30, 1893, No. 5,491, and in Denmark February 21, 1894.

*To all whom it may concern:*

Be it known that I, NICOLAS ISELI, of Chaux-de-Fonds, Switzerland, have invented a certain new and useful Improvement in Filtering Material for the Purification of Alcohols, Oils, or other Substances, (for which Letters Patent have been granted to me in France, dated January 28, 1893, No. 225,642; in Great Britain, dated February 9, 1893, No. 2,896; in Belgium, dated February 9, 1893, No. 103,392; in Italy, dated February 10, 1893, No. 33,505; in Austria-Hungary, dated August 26, 1893, No. 12,700; in Denmark, dated February 21, 1894, and in Sweden, dated October 30, 1893, No. 5,491,) of which the following is a specification.

The filtration of alcoholic liquids by means of ordinary granular charcoal has the disadvantage of not filtering the alcohol with sufficient cleanness and that a relatively large portion of alcohol is retained by the charcoal. Moreover, a disadvantage of the usual filtration is that in spite of the high temperature to which the charcoal has been submitted it retains materials which have a disadvantageous action when subsequently used for filtering purposes. The porosity and contact-surfaces of the charcoal in such filters are moreover insufficient, and those filters and charcoals contain air which can only partly be expelled by means of steam, and such air is also prejudicial to the alcohol.

My invention relates to a filtering material and the process of making the same, such material being adapted to filtering alcoholic liquids, common brandy, oils, and other liquids. The filtering mass is formed from a peculiarly treated and carbonized turf-moss, (*Sphagnum cymbifolium* or *Sphagnum acutifolium*,) which is introduced into cylinders or filters and preferably compressed while in a moist condition. Before carbonizing the turf-moss it is impregnated uniformly with a solution of a material such as sulphate of magnesia, and an equivalent portion of an alkaline solution such as carbonate of soda. Then the mass is dried and heated to white heat in retorts from which the air is excluded. The quantity of sulphate of magnesium and soda used is about three per cent. of the weight of the turf-moss. The refractory materials employed or resulting from the actions hereinafter described prevent the consolidation or lumping of the carbon by the heat, so that it is rendered more porous and thereby caused to offer a larger filtering-surface and a greater efficiency. The soluble materials are washed out previous to using the carbon as a filter.

The materials employed in treating the turf-moss and the process I prefer are as follows: To one hundred kilos of turf-moss is added about one and one-half kilos of sulphate of magnesia dissolved in a suitable quantity of water, so as to moisten the turf-moss with uniformity. The mass is also uniformly impregnated with an alkaline solution such as carbonate of soda. This mass of impregnated turf-moss after being sufficiently dried is heated to a white or glowing heat in a retort from which the air is excluded. The action of the magnesia and soda is expressed in the formula: $MgSO_4 + Na_2CO_3 = MgCO_3 + Na_2SO_4$.

The sulphate of magnesia with which the turf-moss is impregnated is decomposed by the soda, and carbonate of magnesia and sulphate of soda are formed. By the action of a heat of about 800° centigrade the carbonic-acid gas is expelled, together with the empyreumatical materials in the turf-moss, and the soluble substances are afterward washed out and a porous carbon remains that is especially adapted to filtering alcohols, because the filtering-carbon has an affinity for the impurities in the alcohol that are somewhat similar to the empyreumatical substances that have been driven off. Hence such impurities are retained by the carbon, and the nearly pure spirit passes through the filter, and it only requires to be concentrated to make pure alcohol.

The filter-carbon may be treated periodically, as aforesaid, to drive off the impurities that may have been absorbed and retained.

In carrying out my invention I employ a suitable filtering apparatus into which the carbonized turf-moss is introduced in a humid condition and compressed within a cylinder.

Before beginning the filtration clean water is caused to run through the filtering mass from bottom to top of the cylinder in which the same is contained. Thereby the soluble materials and the air contained in the apparatus are completely taken up by the water and expelled, which is a very important feature. After this the liquid which is to be filtered and purified is caused to flow also from the bottom to the top of the apparatus. This is effected preferably by a column of the liquid, the latter being in a tank placed higher than the filter. The water contained in the filter is displaced and expelled by the liquid to be purified and mixes but little therewith.

When the filtration is completed, the alcohol or other material remaining in the filtering mass may be expelled by a new flow of water running through the apparatus, so that there is little loss of alcohol, &c. The impurities for which this improved filtering mass has a great affinity remain in the mass itself.

The ethyle alcohol is filtered pure and may be concentrated by distillation.

I do not limit myself to the specific chemical substances herein named, as others having equivalent properties and acting in a similar manner may be employed.

I claim as my invention—

The improved filtering material for alcohols and other liquids, consisting of porous carbonized turf-moss, (*Sphagnum cymbifolium* or *Sphagnum acutifolium*,) substantially as set forth.

In testimony whereof I have signed my name to this specification in the presence of two subscribing witnesses.

NICOLAS ISELI.

Witnesses:
JULES CHOEPUY,
WALTHER PIERREHUMBERTZ.